United States Patent
Vempati et al.

(10) Patent No.: US 10,107,044 B2
(45) Date of Patent: Oct. 23, 2018

(54) METHODS OF FORMING AND REPAIRING EARTH-BORING TOOLS INCLUDING REPLACEABLE CUTTING STRUCTURES

(71) Applicant: Baker Hughes Incorporated, Houston, TX (US)

(72) Inventors: Chaitanya K. Vempati, Conroe, TX (US); Timothy K. Marvel, The Woodlands, TX (US); Suresh G. Patel, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 487 days.

(21) Appl. No.: 14/824,448

(22) Filed: Aug. 12, 2015

(65) Prior Publication Data

US 2015/0345230 A1    Dec. 3, 2015

Related U.S. Application Data

(62) Division of application No. 13/299,914, filed on Nov. 18, 2011, now Pat. No. 9,115,554.

(Continued)

(51) Int. Cl.

| | |
|---|---|
| *E21B 10/62* | (2006.01) |
| *E21B 10/633* | (2006.01) |
| *B28B 23/00* | (2006.01) |
| *B23K 31/02* | (2006.01) |
| *B24D 3/06* | (2006.01) |
| *B23P 15/28* | (2006.01) |
| *E21B 10/00* | (2006.01) |

(Continued)

(52) U.S. Cl.
CPC .......... *E21B 10/633* (2013.01); *B23K 31/025* (2013.01); *B23P 15/28* (2013.01); *B24D 3/06* (2013.01); *B28B 23/005* (2013.01); *E21B 10/006* (2013.01); *E21B 10/62* (2013.01); *E21B 10/627* (2013.01); *E21B 12/02* (2013.01); *E21B 2010/624* (2013.01); *Y10T 29/49734* (2015.01); *Y10T 29/49741* (2015.01); *Y10T 29/49742* (2015.01); *Y10T 29/49744* (2015.01); *Y10T 29/49746* (2015.01)

(58) Field of Classification Search
CPC .......... E21B 10/62; E21B 10/00; E21B 12/00; E21B 10/42; E21B 10/43
See application file for complete search history.

(56) References Cited

U.S. PATENT DOCUMENTS

| | | |
|---|---|---|
| 2,657,909 A | 11/1953 | Bielstein |
| 2,890,020 A | 6/1959 | Hawthorne et al. |

(Continued)

*Primary Examiner* — Jason L Vaughan
*Assistant Examiner* — Amanda Meneghini
(74) *Attorney, Agent, or Firm* — TraskBritt (57) ABSTRACT

Methods of forming an earth-boring tool may involve attaching one or more cutting elements to a replaceable cutting structure and positioning the replaceable cutting structure proximate a region of a body of an earth-boring tool that is susceptible to at least one of localized wear and localized impact damage. The replaceable cutting structure may be to the body. Methods of repairing an earth-boring tool may involve bringing a replaceable cutting structure proximate at least one portion of a body of an earth-boring tool exhibiting at least one of localized wear and localized impact damage. The replaceable cutting structure may be attached to the earth-boring tool at the at least one portion.

8 Claims, 5 Drawing Sheets

Related U.S. Application Data (60) Provisional application No. 61/415,737, filed on Nov. 19, 2010.

(51) Int. Cl.
*E21B 10/627* (2006.01)
*E21B 12/02* (2006.01)

(56) References Cited

U.S. PATENT DOCUMENTS

| | | | |
|---|---|---|---|
| 3,163,245 A * | 12/1964 | York | ................... E21B 10/42 175/391 |
| 4,533,004 A | 8/1985 | Ecer | |
| 4,660,659 A | 4/1987 | Short et al. | |
| 5,503,236 A | 4/1996 | Tibbitts et al. | |
| 5,560,440 A | 10/1996 | Tibbitts et al. | |
| 6,260,636 B1 | 7/2001 | Cooley et al. | |
| 7,331,410 B2 * | 2/2008 | Yong | ................... E21B 10/16 175/331 |
| 7,814,997 B2 | 10/2010 | Aliko et al. | |
| 2006/0048973 A1 | 3/2006 | Brackin et al. | |
| 2008/0206576 A1 | 8/2008 | Qian et al. | |
| 2008/0308321 A1 | 12/2008 | Aliko et al. | |
| 2010/0089649 A1 | 4/2010 | Welch et al. | |
| 2012/0125695 A1 | 5/2012 | Vempati et al. | |

\* cited by examiner

METHODS OF FORMING AND REPAIRING EARTH-BORING TOOLS INCLUDING REPLACEABLE CUTTING STRUCTURES

CROSS-REFERENCE TO RELATED APPLICATION

This application is a divisional of U.S. patent application Ser. No. 13/299,914, filed Nov. 18, 2011, now U.S. Pat. No. 9,115,554, issued Aug. 25, 2015, which application claims the benefit of U.S. Provisional Patent Application Ser. No. 61/415,737, filed Nov. 19, 2010, the disclosure of each of which is incorporated in this disclosure in its entirety by this reference.

FIELD

Embodiments of the present disclosure relate generally to earth-boring tools and, more specifically, to earth-boring tools including replaceable cutting structures.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit, conventionally in pockets formed in blades and other exterior portions of the bit body. Rolling cone earth-boring drill bits include a plurality of cutters attached to bearing pins on legs depending from a bit body. The cutters may include cutting elements (sometimes called "teeth") milled or otherwise formed on the cutters, which may include hardfacing on the outer surfaces of the cutting elements, or the cutters may include cutting elements (sometimes called "inserts") attached to the cutters, conventionally in pockets formed in the cutters. Other bits might include impregnated bits that typically comprise a body having a face comprising a superabrasive impregnated material, conventionally a natural or synthetic diamond grit or thermally stable diamond elements dispersed in a matrix of surrounding body material or segments of matrix material brazed to the bit body.

The cutting elements used in such earth-boring tools often include polycrystalline diamond cutters (often referred to as "PDCs"), which are cutting elements that include a polycrystalline diamond (PCD) material. Such polycrystalline diamond cutting elements are formed by sintering and bonding together relatively small diamond grains or crystals under conditions of high temperature and high pressure in the presence of a catalyst (such as, for example, cobalt, iron, nickel, or alloys and mixtures thereof) to form a layer of polycrystalline diamond material on a cutting element substrate. These processes are often referred to as high-temperature/high-pressure (or "HTHP") processes. The cutting element substrate may comprise a cermet material (i.e., a ceramic-metal composite material) such as, for example, cobalt-cemented tungsten carbide. In such instances, the cobalt (or other catalyst material) in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HTHP process.

Exposed portions of cutting elements, such as, for example, diamond tables, portions of substrates, hardfacing disposed on the outer surfaces of cutting elements, and exposed surfaces of the earth-boring tool, for example, blade surfaces and fluid courses and junk slot surfaces of a drag bit or the cutters of a rolling cone bit, may be subject to failure modes, such as, for example, erosion, fracture, spalling, and diamond table delamination due to abrasive wear, impact forces, and vibration during drilling operations from contact with the formation being drilled. Some portions of the earth-boring tool may be more susceptible to such failure modes, and localized wear and localized impact damage may cause the earth-boring tool to fail prematurely while leaving other portions of the earth-boring tool in a usable condition. For example, cutting elements and the blades to which they are attached may be more susceptible to failure at the shoulder region of a face of the bit body as compared to the central portion of the face of the bit body or gage region of the bit body. In such instances, an annular shaped groove may wear into the face of the bit body at the shoulder region, a phenomenon sometimes referred to as "ring out" or "pocket damage." Further, cutting elements and the blades to which they are attached may be susceptible to failure at a central, core region of a drill bit located on the face thereof, resulting in "core out." Other earth-boring tools may similarly exhibit localized wear in certain portions of the earth-boring tools.

BRIEF SUMMARY

In some embodiments, the present disclosure includes earth-boring tools comprising a body and one or more replaceable cutting structures attached to the body at a face region of the body. Each replaceable cutting structure comprises an attachment member and a cutting portion configured to engage an underlying earth formation.

In additional embodiments, the present disclosure includes an earth-boring tool, comprising a body and one or more replaceable cutting structures. The body comprises a face comprising a shoulder region adjacent a gage region and a plurality of blades extending over the face through the shoulder region to, and including, the gage region. Each replaceable cutting structure comprises an attachment member, the attachment member comprising at least one blade segment attached to a blade of the plurality of blades at the shoulder region, and one or more cutting elements attached to the at least one blade segment.

In further embodiments, the present disclosure includes methods of forming an earth-boring tool comprising attaching one or more cutting elements to a replaceable cutting structure; positioning the replaceable cutting structure proximate a region of a body of an earth-boring tool that is susceptible to at least one of localized wear and localized impact damage; and attaching the replaceable cutting structure to the body.

In additional embodiments, the present disclosure includes methods of forming an earth-boring tool comprising attaching one or more cutting elements to a replaceable cutting structure; positioning the replaceable cutting structure proximate a region of a body of an earth-boring tool that is susceptible to at least one of localized wear and impact damage; and attaching the replaceable cutting structure to the body at the region that is susceptible to localized wear.

In still further embodiments, the present disclosure includes methods of forming an earth-boring tool comprising positioning a replaceable cutting structure in a mold configured to form a body of an earth-boring tool at a portion of the mold configured to form a region of the body that is susceptible to localized wear; and forming the body around the replaceable cutting structure within the mold.

In additional embodiments, the present disclosure includes methods of repairing an earth-boring tool comprising bringing a replaceable cutting structure proximate at least one portion of a body of an earth-boring tool exhibiting at least one of localized wear and localized impact damage, the replaceable cutting structure comprising an attachment member exhibiting a geometry cooperative with the at least one portion and a cutting portion configured to engage an underlying earth formation; and attaching the replaceable cutting structure to the earth-boring tool at the at least one portion.

BRIEF DESCRIPTION OF THE DRAWINGS

While the specification concludes with claims particularly pointing out and distinctly claiming that which is regarded as the present disclosure, various features and advantages of embodiments of this disclosure may be more readily ascertained from the following description of embodiments of the disclosure when read in conjunction with the accompanying drawings, in which:

DETAILED DESCRIPTION

Some of the illustrations presented herein are not meant to be actual views of any particular earth-boring tool, cutting element, or replaceable cutting structure, but are merely idealized representations that are employed to describe embodiments of the present disclosure. Additionally, elements common between figures may retain the same or similar numerical designation.

Although some embodiments of the present disclosure are depicted as being used and employed in earth-boring rotary drill bits, such as fixed-cutter rotary drill bits, persons of ordinary skill in the art will understand that replaceable cutting structures in accordance with the present disclosure may be employed with any earth-boring tool. Accordingly, the terms "earth-boring tool" and "earth-boring drill bit," as used herein, mean and include any type of bit or tool used for drilling during the formation or enlargement of a wellbore in a subterranean formation and include, for example, rolling cone bits, core bits, eccentric bits, bicenter bits, reamers, expandable reamers, mills, drag bits, hybrid bits, impregnated bits, and other drilling bits and tools known in the art.

As used herein, the teen "cutting element" means and includes any structure configured to engage an earth formation including, by way of example and without limitation, tungsten carbide inserts, polycrystalline diamond compact (PDC) cutting elements and inserts, thermally stable polycrystalline (TSP) diamond compact cutting elements, natural diamonds, superabrasive-impregnated elements, and other cutting element materials and structures as known in the art. In addition, cutting elements and cutting faces thereof may include any geometric shape or configuration, such as, for example, cylindrical, dome-shaped, tombstone, chisel-shaped, pyramids, and other shapes and configurations as known in the art.

Figure 1:
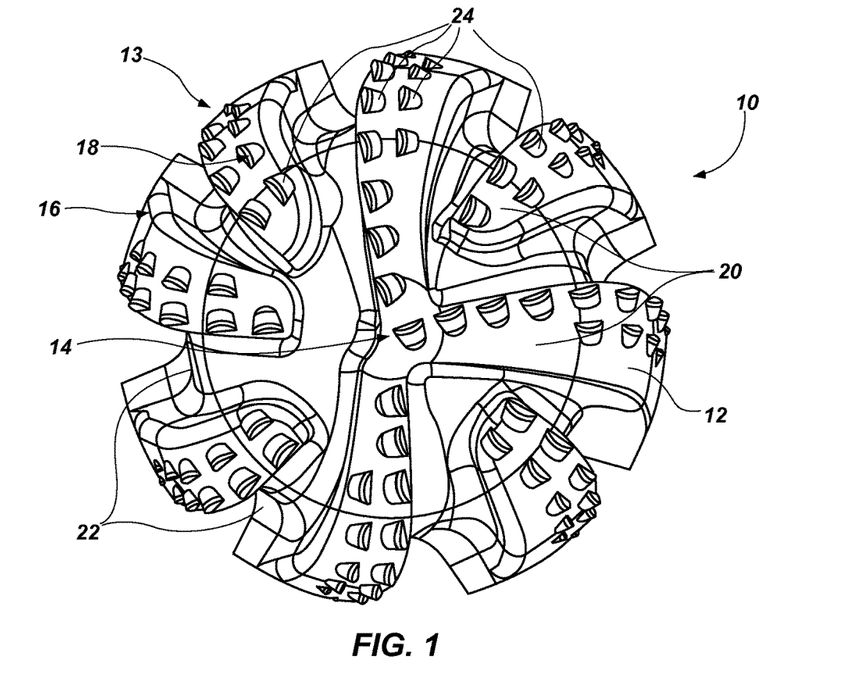
FIG. 1 illustrates an overhead view of an earth-boring tool including a replaceable cutting structure in accordance with an embodiment of the present disclosure.
Figure 2:
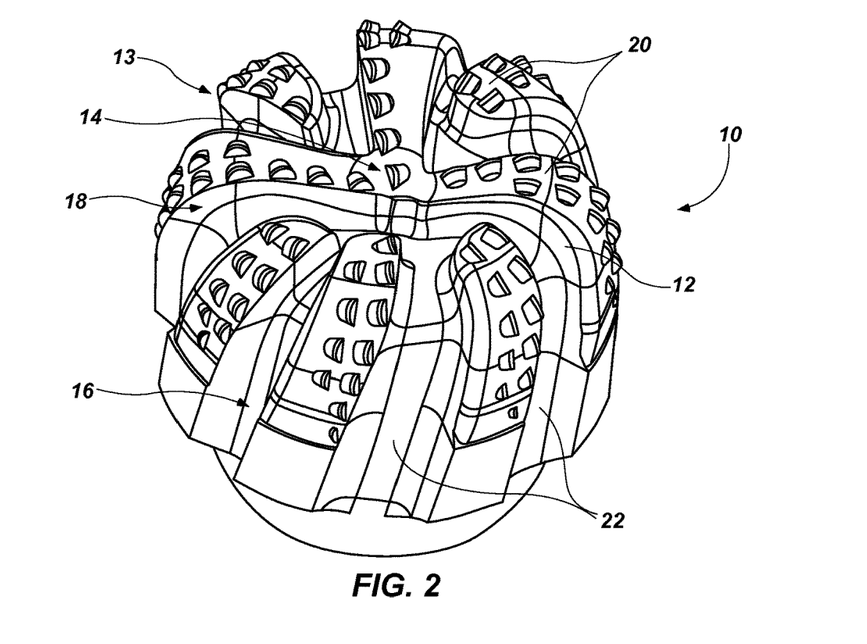
FIG. 2 illustrates a perspective view of the earth-boring tool including the replaceable cutting structure shown in FIG. 1.

Referring to FIGS. 1 and 2, an earth-boring tool 10 including a replaceable cutting structure 12 in accordance with the present disclosure is shown. The earth-boring tool 10 includes a body 13 comprising a face 14, a gage region 16, and a shoulder region 18 at a radially outer portion of the face 14 proximate the gage region 16. A plurality of circumferentially spaced blades 20 extends longitudinally from the face 14 over the shoulder region 18 and along the gage region 16. A plurality of junk slots 22 also extends longitudinally from the face 14 over the shoulder region 18 and along the gage region 16 in the circumferential spaces between adjacent blades 20. A plurality of cutting elements 24 is attached to the body 13 on the blades 20 thereof. The cutting elements 24 may be at least partially disposed in recesses, which may also be characterized as "pockets," formed in the blades 20.

A replaceable cutting structure 12 may be attached to the earth-boring tool 10 at the shoulder region 18. In other embodiments, a replaceable cutting structure may be attached to an earth-boring tool at other locations such as, for example, on the face of a rotary drag bit, on the face of an impregnated bit, on a supporting ring of cutting elements of a roller cone on a rolling cone drill bit. In further embodiments, a replaceable cutting structure may be attached to an earth-boring tool on a formation-engaging portion of a reamer tool, on a region of a hybrid bit susceptible to at least one of localized wear and localized impact damage, or on any other portion of an earth-boring tool that is susceptible to at least one of localized wear and localized impact damage as a result of drilling.

Figure 3:
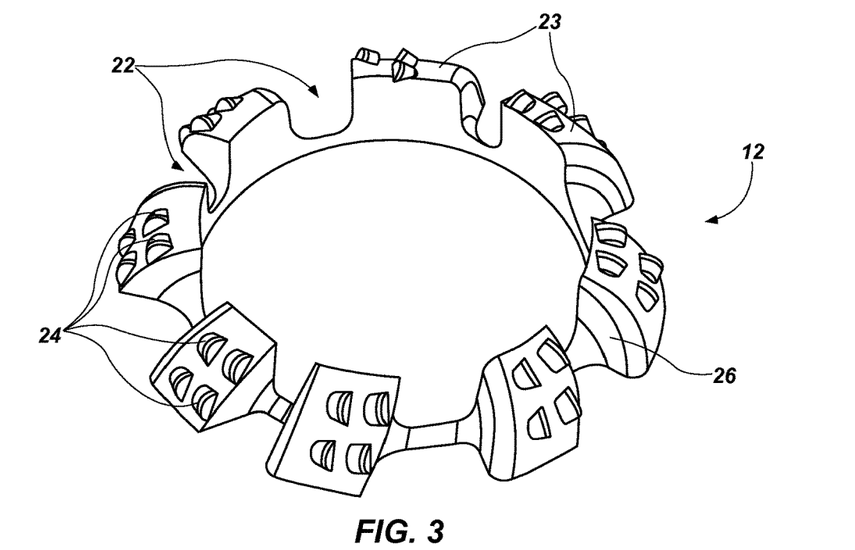
FIG. 3 illustrates a perspective view of a replaceable cutting structure in accordance with an embodiment of the present disclosure.
Figure 4:
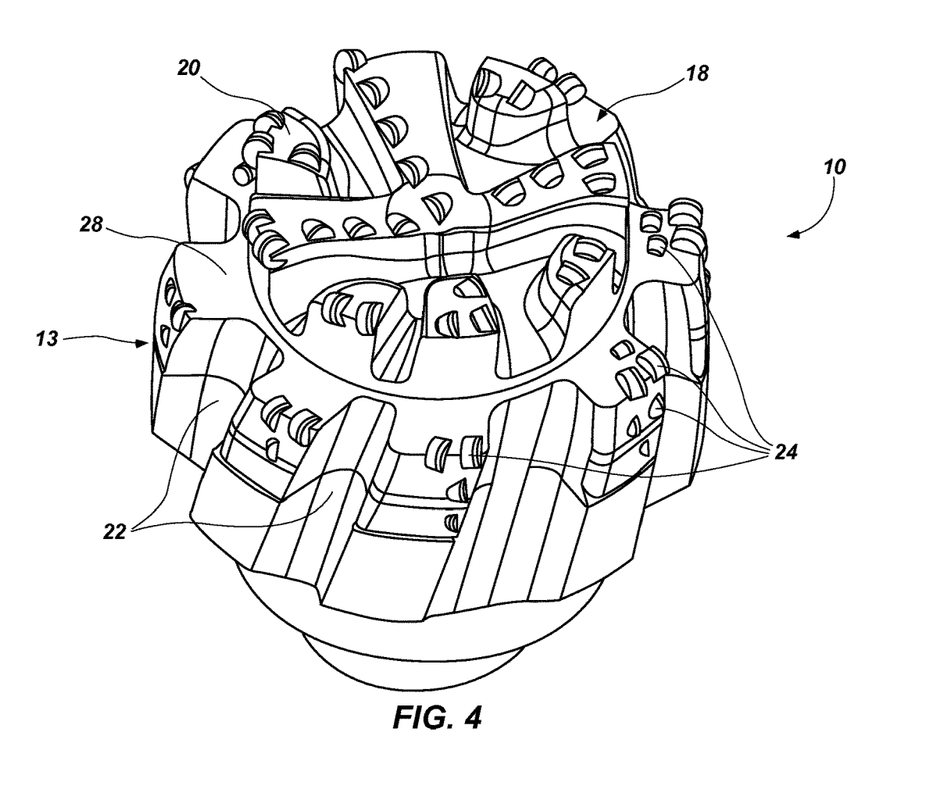
FIG. 4 illustrates a perspective view of an earth-boring tool to which a replaceable cutting structure in accordance with one or more embodiments of the disclosure may be attached.

As shown in FIG. 3, a replaceable cutting structure 12 may comprise an attachment member 26 in the form of a plurality of blade segments 23 and a cutting portion configured to engage an underlying earth formation. The cutting portion may comprise, for example, a plurality of cutting elements 24, as shown in FIG. 3, or a superabrasive material disposed in a matrix material, such as, for example, a diamond material in a metal matrix. The blade segments 23 may comprise interconnected portions of an annular member generally conforming to an exterior shape of a body 13 of an earth-boring tool 10 at a shoulder region 18 (see FIG. 4). Thus, portions of blades 20 in the form of blade segments 23 and of intervening junk slots 22 may be formed in the attachment member 26, enabling the attachment member 26 to provide an at least substantially smooth transition between adjacent exterior surfaces of the earth-boring tool 10 and the replaceable cutting structure 12. The replaceable cutting structure 12 may be configured to attach to a body 13 of an earth-boring tool 10, for example, on the face 14 thereof. The attachment member 26 may comprise planar surfaces at right angles to one another at the inner and lower surfaces of the attachment member 26, the planar surfaces being configured to abut against and attach to cooperative surfaces on the body 13 of an earth-boring tool 10. In other embodiments, the inner and lower surfaces of attachment member 26, and the cooperative surfaces of the body 13 may not be planes at right angles to one another, but may be curved, angled, notched, or may have other cooperative interface features, such as, for example, recesses or protrusions, disposed thereon. In broad terms, the attachment member 26 may be said to be configured for disposition in one or more cooperatively configured seats on the body 13. The cutting elements 24 are attached to the blade segments 23 of the attachment member 26. The cutting elements 24 may be disposed in multiple rows along the blade segments 23 of the attachment member 26. In other embodiments, the cutting elements 24 may be disposed in a single row at the rotationally leading end of the blade segments 23 or, alternatively, a single cutting element 24 may be disposed on each blade segment 23 of the attachment member 26.

The attachment member 26 may comprise at least one cutting element accommodation recess in an underside thereof. At least one cutting element 24 already attached to an earth-boring tool 10 (see FIG. 4) at a location of intended mounting of the attachment member 26 may protrude from a surface of the body 13 of the earth-boring tool 10 in an area of seat 28 and, absent formation of at least one corresponding cutting element accommodation recess, interfere with attachment of the attachment member 26 to the body 13 of the earth-boring tool 10. Each cutting element accommodation recess may enable a corresponding cutting element 24 already mounted to the body 13 to be partially disposed therein while enabling attachment of the attachment member 26 to the body 13 of the earth-boring tool 10 with minimal cutting element 24 interference.

The size of the replaceable cutting structure 12 may correspond to a predicted radially and circumferentially extending region of localized wear occurring on a shoulder region 18 or other region of a body 13 of an earth-boring tool 10 as a result of use of the earth-boring tool 10 in a drilling or reaming operation. The region of localized wear may be predicted using computer modeling, such as, for example, finite element analysis, or by observation of localized wear in the field. Thus, the replaceable cutting structure 12 may be sized to enable easy replacement of a region of a body 13 of an earth-boring tool 10 most susceptible to localized wear and, therefore, most likely to cause premature failure of the earth-boring tool 10. In addition, the replaceable cutting structure 12 may enable replacement of a worn portion of an earth-boring tool with a replaceable cutting structure 12 having increased wear resistance, impact strength, fracture toughness, or any combination of these.

Referring again to FIG. 4, an earth-boring tool 10 to which a replaceable cutting structure 12 (see FIG. 3) may be attached is shown. The earth-boring tool 10 includes a seat 28 formed in the shoulder region 18 of the body 13 of the earth-boring tool 10. Surfaces defining the seat 28 may be configured correspondingly to abut against and attach to a replaceable cutting structure 12 (see FIG. 3). Thus, the seat 28 may comprise planar surfaces at right angles to one another. In other embodiments, the surfaces defining the seat 28 and the adjacent surfaces of the replaceable cutting structure 12 for mounting thereon may not be planes at right angles to one another, but may be curved, angled, notched, or may have interface features, such as, for example, recesses or protrusions, disposed thereon. The material of the body 13 of the earth-boring tool 10 may be machinable, enabling the surfaces that define the seat 28 to be formed in the body 13. For example, if the body 13 suffers wear during a drilling operation, such wear may result in uneven surfaces on the body 13, so the worn area may be machined to relatively precise tolerances to form the seat 28 for placement and attachment of the replaceable cutting structure 12 thereto.

The earth-boring tool 10, itself may comprise at least one cutting element accommodation recess. At least one cutting element 24 attached to an attachment member 26 (see FIG. 3) may protrude from a surface of the attachment member 26 of a replaceable cutting structure 12 and, absent formation of at least one corresponding cutting element accommodation recess in body 13, interfere with attachment of the attachment member 26 to the body 13 of the earth-boring tool 10. Each cutting element accommodation recess may enable a corresponding cutting element 24 to be partially disposed therein while enabling attachment of the attachment member 26 to the body 13 of the earth-boring tool 10 with minimal cutting element 24 interference.

Figure 5:
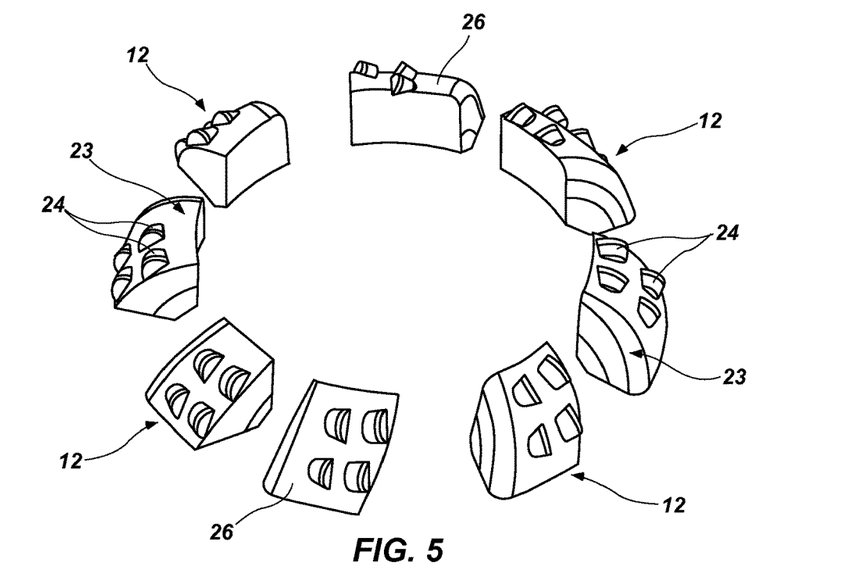
FIG. 5 illustrates a perspective view of a plurality of replaceable cutting structures in accordance with an embodiment of the disclosure.

As shown in FIG. 5, a plurality of replaceable cutting structures 12 may be provided. Each replaceable cutting structure 12 may comprise one or more cutting elements 24 mounted to an attachment member 26 in the form of a single blade segment 23 generally conforming to the shape of adjacent portions of blades 20 on a body 13 of an earth-boring tool 10 (see FIG. 6), enabling the attachment member 26 to provide an at least substantially smooth transition between the adjacent surfaces of the body 13 of the earth-boring tool 10 and the replaceable cutting structure 12. Each replaceable cutting structure 12 may be configured to attach to the body 13 of the earth-boring tool 10. Each attachment member 26 may comprise planar surfaces at right angles to one another at the inner and lower surfaces of the attachment member 26, the planar surfaces being configured to abut against and attach to the body 13 of an earth-boring tool 10. In other embodiments, the inner and lower surfaces of the attachment member 26 may not be planes at right angles to one another, but may be curved, angled, notched, or may have interface features, such as, for example, recesses or protrusions, disposed thereon. The cutting elements 24 may be disposed in multiple rows along the blade segments 23 formed in the attachment member 26. In other embodiments, the cutting elements 24 may be disposed in a single row at the rotationally leading end of the blade segments 23 or a single cutting element 24 may be disposed on each blade segment 23 of the attachment member 26.

The attachment member 26 may comprise at least one cutting element accommodation recess. At least one cutting element 24 attached to a body 13 of an earth-boring tool 10 (see FIG. 4) may protrude from a surface of the body 13 of the earth-boring tool 10 in the area of seat 28 and, absent formation of at least one corresponding cutting element accommodation recess, interfere with attachment of the attachment member 26 to the body 13 of the earth-boring tool 10. Each cutting element accommodation recess may enable a corresponding cutting element 24 on body 13 to be partially disposed in the underside of attachment member 26 while enabling attachment of the attachment member 26 to the body 13 of the earth-boring tool 10 with minimal cutting element 24 interference.

As previously noted, size of the replaceable cutting structure 12 may correspond to a predicted region of localized wear on a shoulder region 18 or other region of an earth-boring tool 10. The region of localized wear may be predicted using computer modeling, such as, for example, finite element analysis, or by observation of localized wear in the field. Thus, the replaceable cutting structure 12 may be sized to enable easy replacement of a region of an earth-boring tool 10 most susceptible to localized wear and, therefore, most likely to cause premature failure of the earth-boring tool 10.

Figure 6:
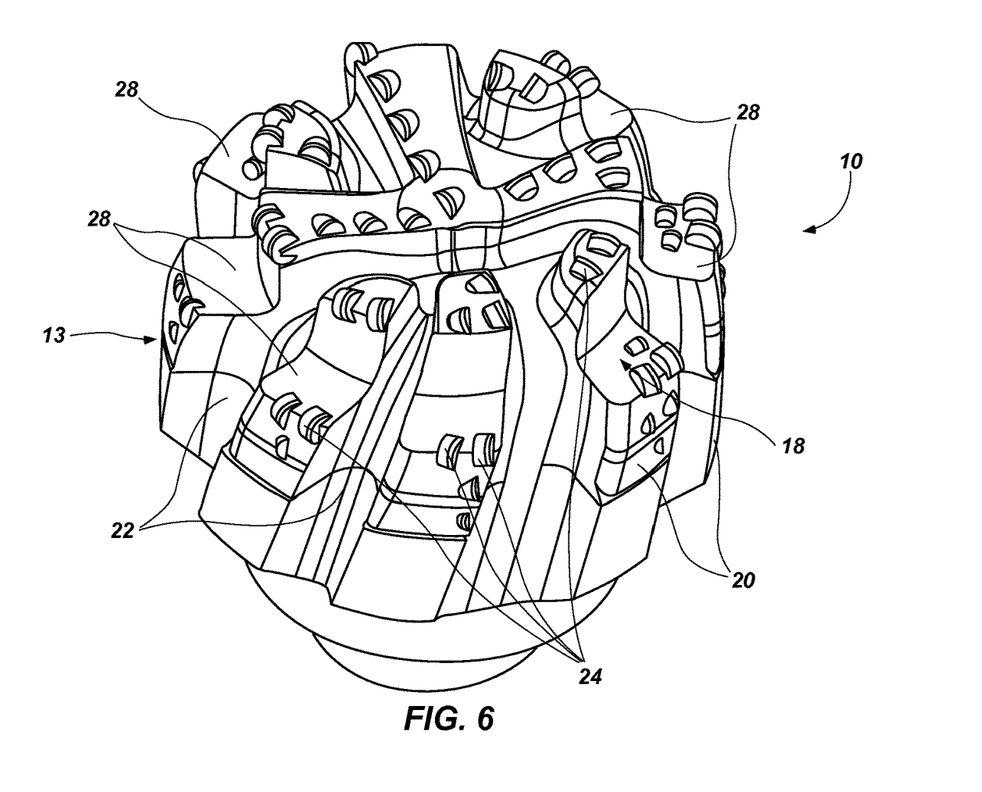
FIG. 6 illustrates a perspective view of an earth-boring tool to which a plurality of replaceable cutting structures in accordance with one or more embodiments of the disclosure may be attached.

Referring to FIG. 6, an earth-boring tool 10 to which a plurality of replaceable cutting structures 12 (see FIG. 5) may be attached is shown. The earth-boring tool 10 includes a plurality of seats 28 formed in blades 20 at the shoulder region 18 of a body 13 of the earth-boring tool 10. Surfaces defining the seats 28 may be configured correspondingly to abut against and attach to a like plurality of replaceable cutting structures 12 in the form of blade segments 23 (see FIG. 5). Thus, the seats 28 may comprise planar surfaces at right angles to one another. In other embodiments, the surfaces defining the seats 28 and cooperative surfaces of blade segments 23 may not be planes at right angles to one another, but may be curved, angled, notched, or may have interface features, such as, for example, recesses or protrusions, disposed thereon. The material of the body 13 of the earth-boring tool 10 may be machinable, enabling the surfaces that define the seat 28 to be formed in the body 13.

The earth-boring tool 10 may comprise at least one cutting element accommodation recess. At least one cutting element 24 attached to an attachment member 26 of a replaceable cutting structure 12 (see FIG. 3) may protrude from a surface of the attachment member 26 and, absent formation of at least one corresponding cutting element accommodation recess, interfere with attachment of the attachment member 26 to the body 13 of the earth-boring tool 10. Each cutting element accommodation recess may enable a corresponding cutting element 24 to be partially disposed therein while enabling attachment of the attachment member 26 to the body 13 of the earth-boring tool 10 with minimal cutting element 24 interference.

Attachment members 26 of replaceable cutting structures 12, such as blade segments 23, may comprise strong, tough, and impact- and abrasion-resistant materials suitable for use in earth-boring applications. For example, an attachment member 26 may comprise a metal or metal alloy, such as, for example, steel, or may comprise a cermet material, such as, for example, sintered tungsten carbide in a matrix material. A hardfacing material may, optionally, be disposed on an exterior portion of the attachment member 26.

Attachment members 26 may be formed by casting a metal part and subsequently machining desired features, such as, for example, attachment surfaces or pockets for receiving cutting elements 24, into the metal part. Alternatively, attachment members 26 may be formed by distributing a plurality of hard particles, such as, for example, tungsten carbide particles, and a plurality of particles comprising a matrix material, such as, for example, copper, copper-based alloys, cobalt, and cobalt-based alloys, in a mold (not shown). In some cases, the matrix material may be melted and infiltrated into the plurality of hard particles. In other cases, the hard particles and particles comprising a matrix material may then be pressed in the mold to form a green part. The hard particles and particles comprising a matrix material may then be subjected to a densification process. For example, the green part may be subjected to heat and pressure to at least partially sinter the green part. The green part may be partially sintered to form a brown part, or may be sintered to a final density. The green, brown, or fully sintered part may also have desired features, such as, for example, attachment surfaces or cutting element 24 pockets, formed therein. Such desired features may be machined, for example, in a green or brown part, or may be molded into an infiltrated part or a fully sintered part. Cutting elements 24 may be attached to the attachment member 26 in pockets formed therein by welding, brazing, shrink-fit, by being captured due to shrinkage of the attachment member 26 during a densification process, or by other means as known in the art. Cutting elements 24 may be attached to the attachment member 26 before or after the attachment member 26 is, itself attached to a body 13 of an earth-boring tool 10.

Replaceable cutting structures 12 may be attached to bodies 13 of earth-boring tools 10. For example, at least one replaceable cutting structure 12 may be attached to a body 13 of an earth-boring tool 10 by welding, by brazing, by shrink-fit, by press-fit, by screws, by bolts, by pins, by keys, by mutually engaging threads on a replaceable cutting structure 12 and a body 13, by being captured due to shrinkage of an earth-boring tool 10 during a densification process, or by other means as known in the art. Alternatively, at least one preformed replaceable cutting structure 12 may be placed in a mold. The body 13 of an earth-boring tool 10 may then be cast in the mold around the replaceable cutting structure 12, thereby attaching it to the body 13 of the earth-boring tool 10.

In operation, a replaceable cutting structure 12 may be subjected to greater wear than other regions of an earth-boring tool 10 during a drilling or reaming operation, resulting in localized wear of the replaceable cutting structure 12. For example, as a rotary drag bit rotates in a borehole and engages the underlying earth formation, the combination of abrasive wear, impact forces, and vibrations may cause the replaceable cutting structure 12 to wear down more quickly than other portions and features of the earth-boring tool 10, such as, for example, other portions of the face 14, and the gage region 16. When an operator determines that the replaceable cutting structure 12 has worn down to a selected extent, or when the bit ceases to drill an underlying earth formation at an acceptable rate in the borehole, the earth-boring tool 10 may be extracted from the borehole. The body 13 of the bit and remaining portions of the replaceable cutting structure 12 may be machined to return a seat 28 at a shoulder region 18 of the body 13 to a geometry it exhibited prior to being deployed in the borehole or to a new, selected geometry. Another replaceable cutting structure 12 may then be attached to the body 13, and the earth-boring tool 10 redeployed in the borehole or deployed in another borehole. Therefore, replaceable cutting structures 12 may increase the useful life of an earth-boring tool 10 by enabling replacement of the region most susceptible to localized wear and, therefore, most likely to cause premature failure of the earth-boring tool 10.

Figure 7:
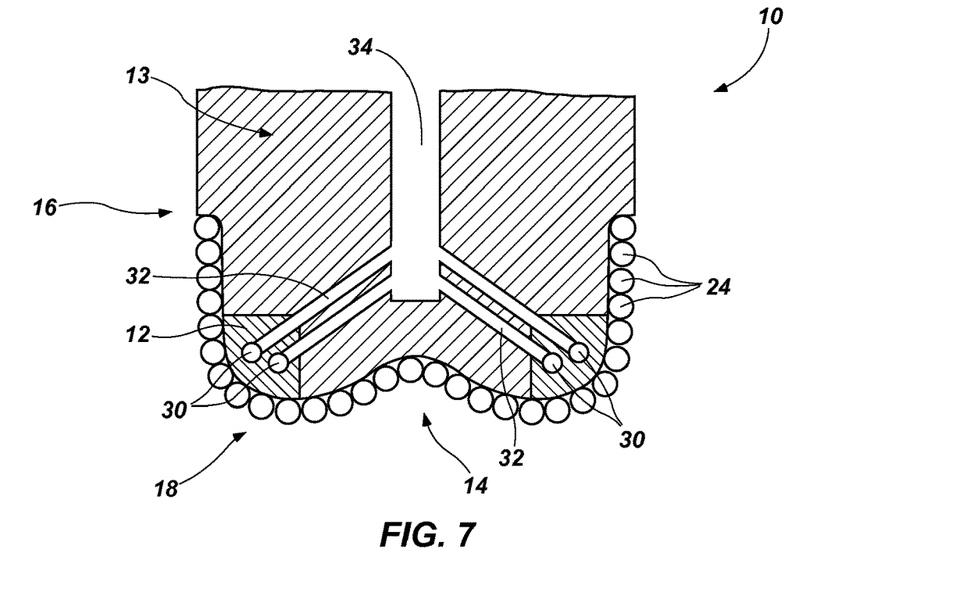
FIG. 7 illustrates a perspective view of an earth-boring tool including a replaceable cutting structure in accordance with an embodiment of the present disclosure.

An earth-boring tool 10 may comprise one or more failure detection features. Referring to FIG. 7, an earth-boring tool 10 comprising a plurality of outlets 30 exposed at an outer surface of a replaceable cutting structure 12 is shown. The outlets 30 comprise channels formed in the replaceable cutting structure 12 and having openings at the outer surface of the replaceable cutting structure 12 at a rotationally leading end thereof. A plurality of channels 32 is formed internally in a body 13 of the earth-boring tool 10 corresponding to and aligned with the outlets 30, placing the outlets 30 in fluid communication with an internal plenum 34 formed in the body 13 of the earth-boring tool 10. As the earth-boring tool 10 engages the underlying earth formation, drilling fluid is pumped down the internal plenum 34, through the channels 32, and out the outlets 30, which may have flow-controlling and directing nozzles (not shown) adjacent the face 14. The outlets 30 may enable cooling at a region of the earth-boring tool 10 and replaceable cutting structure 12 most susceptible to wear and heat generation. The outlets 30 may also enable drilling fluid to be directed at cutting elements 24, removing cuttings and carrying them up through junk slots 22 (see FIGS. 1 and 2). When the replaceable cutting structure 12 becomes worn to a point where replacement is desirable or necessary, cuttings from the earth formation may become lodged in the channels 32 or worn outlets 30, causing a pressure spike in drilling fluid pressure which is detectable at the rig floor (not shown). Therefore, the nozzles 30 may enable an operator to detect when the replaceable cutting structure 12 should or must be replaced.

Figure 8:
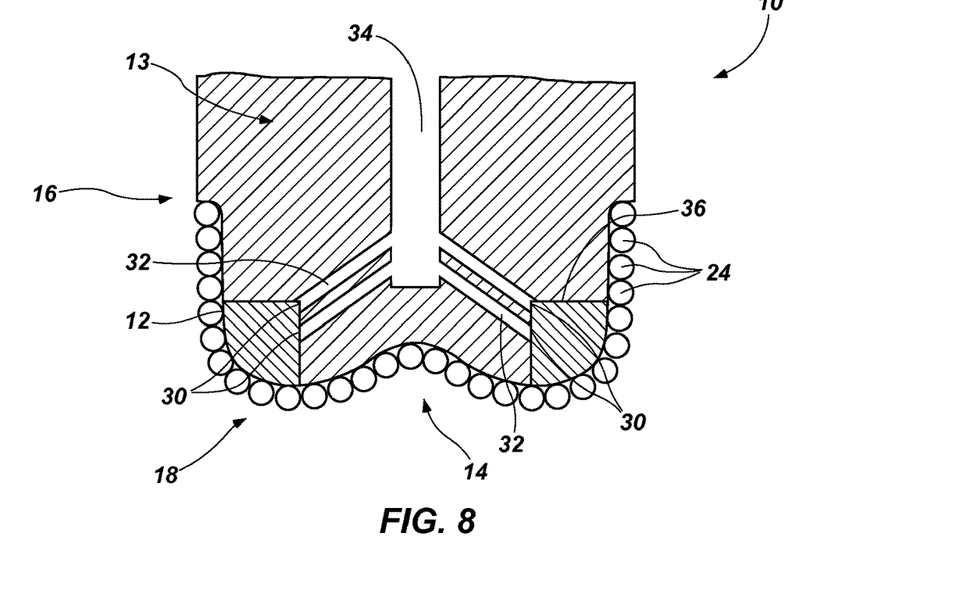
FIG. 8 illustrates a perspective view of an earth-boring tool including a replaceable cutting structure in accordance with an embodiment of the present disclosure.

As shown in FIG. 8, outlets 30 may also be located at an interface 36 between a body 13 of an earth-boring tool 10 and a replaceable cutting structure 12. The outlets 30 comprise openings formed in the body 13 and are located at the interface 36 between the replaceable cutting structure 12 and the body 13. A plurality of channels 32 is formed internally in the body 13 of the earth-boring tool 10 leading to the outlets 30, placing the outlets 30 in fluid communication with an internal plenum 34 formed in the body 13 of the earth-boring tool 10. As the earth-boring tool 10 engages the underlying earth formation, drilling fluid is pumped down the internal plenum 34, through the channels 32, and to the outlets 30. When the replaceable cutting structure 12 becomes worn to a point where the outlets 30 become exposed, the drilling fluid may begin circulating through the nozzles, causing a pressure drop in drilling fluid pressure, which is detectable at the rig floor. Therefore, the outlets 30 may enable an operator to detect when the replaceable cutting structure 12 should or must be replaced.

Figure 9:
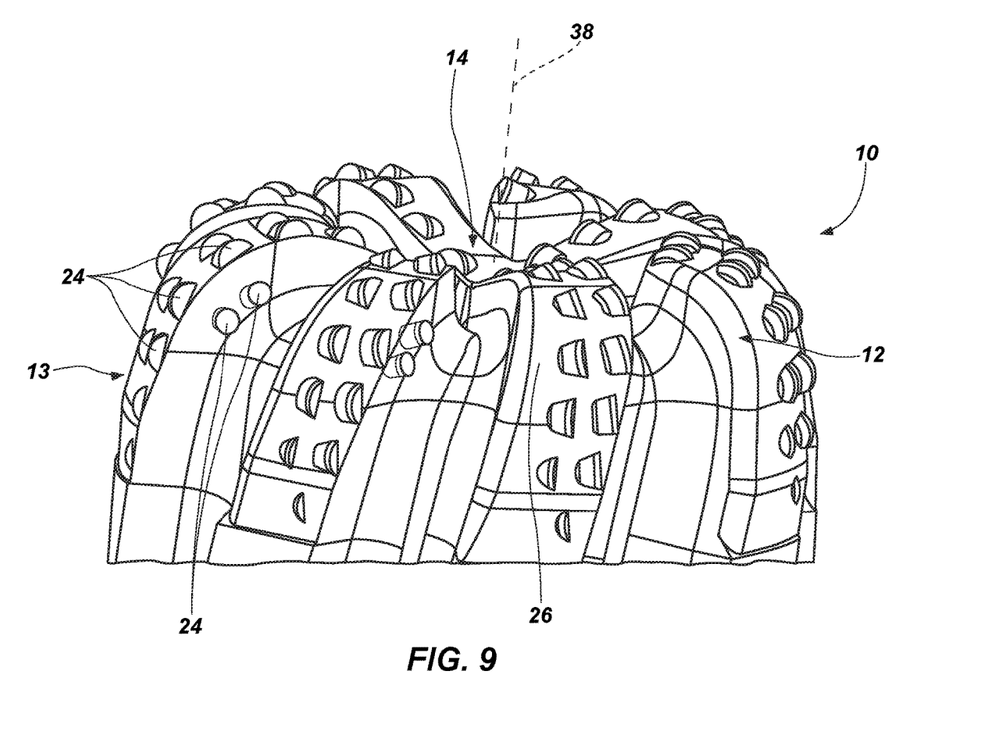
FIG. 9 illustrates a partial perspective view of an earth-boring tool including a replaceable cutting structure in accordance with an embodiment of the present disclosure.

Referring to FIG. 9, a self-sharpening replaceable cutting structure 12 attached to a body 13 of an earth-boring tool 10 is shown. The self-sharpening replaceable cutting structure 12 includes a first plurality of cutting elements 24. The first plurality of cutting elements 24 is attached to an attachment member 26 of the replaceable cutting structure 12, and at least a portion of each cutting element 24 of the first plurality is exposed. Cutting elements 24 of the first plurality are configured to engage an earth formation directly once the earth-boring tool 10 is deployed. The self-sharpening replaceable cutting structure 12 further comprises at least another plurality of cutting elements 24. Cutting elements 24 of the at least another plurality are located below cutting elements 24 of the first plurality. In other words, the cutting elements 24 of the at least another plurality are located closer to an axial centerline 38 of the body 13 than the cutting elements 24 of the first plurality. The cutting elements 24 of the at least another plurality may be completely embedded within the attachment member 26. For example, the attachment member 26 may be formed around the cutting elements 24 of the at least another plurality. In other embodiments, cutting elements 24 of the at least another plurality may be at least partially exposed, being disposed in pockets formed in the attachment member 26. As the earth-boring tool 10 engages an underlying earth formation, the first plurality of cutting elements 24 and the attachment member 26 may wear down to a point where the cutting elements 24 of the first plurality become so worn as to be dislodged. The at least another plurality of cutting elements 24 may then be exposed and begin engaging the earth formation. Thus, the at least another plurality of cutting elements 24 may enable the replaceable cutting structure 12 to be self-sharpening.

While the present disclosure has been described herein with respect to certain embodiments, those of ordinary skill in the art will recognize and appreciate that it is not so limited. Rather, many additions, deletions, and modifications to the embodiments described herein may be made without departing from the scope of the disclosure as hereinafter claimed, including legal equivalents. In addition, features from one embodiment may be combined with features of another embodiment while still being encompassed within the scope of the disclosure as contemplated by the inventors.

What is claimed is:

1. A method of forming an earth-boring tool, comprising:
  attaching a plurality of cutting elements to an annular attachment member to form a replaceable cutting structure;
  positioning the replaceable cutting structure proximate each blade of a plurality of blades at least within a shoulder region of a face of a body of an earth-boring tool that is susceptible to at least one of localized wear and localized impact damage, to cause an exposed surface of the attachment member to be at least substantially flush with exposed surfaces of the body adjacent to the attachment member, and the attachment member to extend contiguously around a circumference of the face of the body at least within the shoulder region; and
  attaching the replaceable cutting structure to the body.

2. The method of forming an earth-boring tool of claim 1, further comprising positioning the replaceable cutting structure over an outlet in fluid communication with an internal plenum of the body.

3. The method of forming an earth-boring tool of claim 2, wherein the annular attachment member comprises a channel extending at least partially through the annular attachment member and wherein positioning the replaceable cutting structure over the outlet in fluid communication with the internal plenum of the body comprises aligning the channel with the outlet.

4. The method of forming an earth-boring tool of claim 1, wherein attaching the replaceable cutting structure to the body comprises one or more of welding the replaceable cutting structure to the body, brazing the replaceable cutting structure to the body, threadedly engaging the replaceable cutting structure with the body, bolting the replaceable cutting structure to the body, affixing the replaceable cutting structure to the body with pins, affixing the replaceable cutting structure to the body with keys, shrink-fitting the replaceable cutting structure with the body, press-fitting the replaceable cutting structure with the body, and capturing the replaceable cutting structure due to shrinkage of the body during a densification process.

5. The method of forming an earth-boring tool of claim 1, wherein attaching the plurality of cutting elements to the annular attachment member comprises attaching a first cutting element of the plurality to the annular attachment member at a first position relative to a centerline of the body and a second cutting element of the plurality to the annular attachment member at a second position relatively closer to the centerline of the body.

6. The method of forming an earth-boring tool of claim 1, wherein positioning the replaceable cutting structure proximate each blade of the plurality of blades at least within the shoulder region of the face of the body comprises positioning the annular attachment member to extend contiguously around a circumference of the face of the body at least within the shoulder region.

7. The method of forming an earth-boring tool of claim 1, wherein attaching the replaceable cutting structure to the body comprises attaching the annular attachment member to each blade of the plurality of blades.

8. The method of forming an earth-boring tool of claim 1, wherein attaching the plurality of cutting elements to the annular attachment member comprises at least partially embedding a first cutting element of the plurality within the attachment member at a first position relative to a centerline of the body and at least partially embedding a second cutting element of the plurality within the attachment member at a second position relatively closer to the centerline of the body.

* * * * *

UNITED STATES PATENT AND TRADEMARK OFFICE
CERTIFICATE OF CORRECTION

PATENT NO. : 10,107,044 B2
APPLICATION NO. : 14/824448
DATED : October 23, 2018
INVENTOR(S) : Chaitanya K. Vempati, Timothy K. Marvel and Suresh G. Patel Page 1 of 1

It is certified that error appears in the above-identified patent and that said Letters Patent is hereby corrected as shown below:

In the Specification

Column 4,    Line 11,    change "herein, the teen" to --herein, the term--

Signed and Sealed this
Twenty-second Day of January, 2019

Andrei Iancu
*Director of the United States Patent and Trademark Office*